(12) United States Patent
Wortman et al.

(10) Patent No.: US 8,545,185 B2
(45) Date of Patent: Oct. 1, 2013

(54) TURBINE ENGINE COMPONENTS WITH ENVIRONMENTAL PROTECTION FOR INTERIOR PASSAGES

(75) Inventors: David John Wortman, Hamilton, OH (US); Roger Dale Wustman, Mason, OH (US); Nicole Marie Polley, Cincinnati, OH (US); Kathleen Diana Brammer, Fort Mitchell, KY (US); Brian Thomas Hazel, West Chester, OH (US)

(73) Assignee: General Electric Company, Schenectady, NY (US)

( * ) Notice: Subject to any disclaimer, the term of this patent is extended or adjusted under 35 U.S.C. 154(b) by 1366 days.

(21) Appl. No.: 11/959,595

(22) Filed: Dec. 19, 2007

(65) Prior Publication Data

US 2009/0162209 A1   Jun. 25, 2009

(51) Int. Cl.
*F01D 5/18*   (2006.01)
(52) U.S. Cl.
USPC .................................. 416/241 B; 416/241 R
(58) Field of Classification Search
USPC ........................................... 416/241 R, 241 B
See application file for complete search history.

(56) References Cited

U.S. PATENT DOCUMENTS

| | | | |
|---|---|---|---|
| 4,148,936 A * | 4/1979 | Grisik et al. | 427/253 |
| 4,321,411 A | 3/1982 | Nakamura et al. | |
| 4,401,697 A | 8/1983 | Strangman | |
| 4,405,659 A | 9/1983 | Strangman | |
| 6,153,313 A | 11/2000 | Rigney et al. | |
| 6,255,001 B1 | 7/2001 | Darolia | |
| 6,283,715 B1 | 9/2001 | Nagaraj et al. | |
| 6,291,084 B1 | 9/2001 | Darolia et al. | |
| 6,296,447 B1 * | 10/2001 | Rigney et al. | 416/241 R |
| 6,921,251 B2 | 7/2005 | Ackerman et al. | |
| 7,026,011 B2 * | 4/2006 | Wustman et al. | 427/252 |
| 7,374,825 B2 * | 5/2008 | Hazel et al. | 428/632 |
| 7,824,738 B2 | 11/2010 | Smith et al. | |
| 2001/0018319 A1 | 8/2001 | Czech | |

(Continued)

FOREIGN PATENT DOCUMENTS

| GB | 2421032 A * | 6/2006 |
|---|---|---|
| JP | 2005061400 A | 3/2005 |

(Continued)

OTHER PUBLICATIONS

JP Office Action dated Feb. 19, 2013 from corresponding JP Application No. 2008-319543.

*Primary Examiner* — Edward Look
*Assistant Examiner* — Aaron R Eastman
(74) *Attorney, Agent, or Firm* — William Scot Andes; Gary M. Hartman; Domenica N. S. Hartman

(57) ABSTRACT

Turbine airfoil components with protective layers and methods therefore. The components are each formed to have a platform, an airfoil extending upwardly from the platform, and a shank extending downwardly from the platform. The shank has an exterior wall and an internal passage, and the airfoil has a cooling flow channel inside the airfoil for flowing a cooling flow therethrough. The component has an interior chromide coating contacting at least a portion of an interior surface of the shank and interdiffused with a base metal thereof, and an exterior chromide coating contacting at least a portion of an exterior surface of the shank and interdiffused with the base metal thereof. The interior and exterior chromide coatings do not have an aluminide coating deposited thereon.

7 Claims, 5 Drawing Sheets

(56) References Cited

U.S. PATENT DOCUMENTS

| | | | |
|---|---|---|---|
| 2002/0172808 A1* | 11/2002 | Wustman et al. | 428/195 |
| 2005/0036891 A1 | 2/2005 | Spitsberg et al. | |
| 2005/0053467 A1* | 3/2005 | Ackerman et al. | 416/241 R |
| 2006/0078432 A1* | 4/2006 | Darolia et al. | 416/241 R |
| 2006/0093849 A1* | 5/2006 | Farmer et al. | 428/651 |
| 2006/0093851 A1* | 5/2006 | Darolia et al. | 428/680 |
| 2006/0204665 A1* | 9/2006 | Buczek et al. | 427/421.1 |
| 2007/0104969 A1* | 5/2007 | Nagaraj et al. | 428/469 |
| 2007/0224411 A1* | 9/2007 | Hazel et al. | 428/334 |
| 2007/0264126 A1 | 11/2007 | Box et al. | |
| 2010/0266409 A1 | 10/2010 | Chandra et al. | |

FOREIGN PATENT DOCUMENTS

| | | |
|---|---|---|
| JP | 2007534846 A | 11/2007 |
| JP | 2009519398 A | 5/2009 |
| WO | WO 2007140805 A1 * | 12/2007 |

* cited by examiner

TURBINE ENGINE COMPONENTS WITH ENVIRONMENTAL PROTECTION FOR INTERIOR PASSAGES

BACKGROUND OF THE INVENTION

This invention relates generally to turbine engines, and more specifically to protective environmental coatings placed on turbine engine components such as turbine blades and vanes.

In a gas turbine engine, air is pressurized in a compressor and mixed with fuel in a combustor for generating hot combustion gases. A high pressure turbine (HPT) follows the combustor and extracts energy from the combustion gases for powering the compressor. A low pressure turbine (LPT) follows the HPT and extracts additional energy from the combustion gases for powering an upstream fan in an aircraft turbofan engine application, or powers an external drive shaft for marine and industrial applications.

The turbines are arranged in stages including a stationary turbine nozzle having a row of vanes which direct the combustion gases into a corresponding row of turbine rotor blades. Each vane has an airfoil configuration extending radially in span between inner and outer bands which bound the combustion gases.

Each turbine blade includes an airfoil extending radially outward in span from an airfoil root at an integral platform. An integral blade shank extends between the platform and an integral dovetail for mounting the blade in a corresponding dovetail slot in the perimeter of a supporting rotor disk. The platform defines the inner boundary for combustion gases, and the radially outer tip of the airfoil is spaced closely adjacent to a surrounding turbine shroud that defines the outer boundary for the combustion gases. The shank supports the mechanical loads from the airfoil and platform and transfers these mechanical loads to the blade dovetail. The shank has interior passages in it which are in flow communication with the cooling passages inside the airfoil. The shank interior passages receive cooling air through passages in the blade dovetail and channel the cooling flow into the airfoil cooling circuits.

The corresponding airfoils of the vanes and blades in each turbine stage have generally concave pressure sides and generally convex suction sides extending axially in chord between opposite leading and trailing edges for efficiently turning the combustion gases and extracting energy therefrom during operation. The differently shaped opposite sides of the airfoils therefore effect different velocity and pressure distributions thereover, and correspondingly experience different heat loads from the combustion gases in highly complex three dimensional (3D) distributions.

The first stage turbine nozzle and blades first receive the hot combustion gases from the combustor and therefore have the greatest heat loads of the various turbine stages. Accordingly, the vanes and blades are typically cast from state of the art superalloy metals which have enhanced strength at elevated temperature for maximizing the useful life thereof during operation. In conventional engines, the turbine vanes and blades are made of nickel based superalloys, and can operate at temperatures of up to about 1900-2100 Deg. F. A protective layer or a metal/ceramic thermal barrier coating (TBC) system is sometimes applied to the airfoil, which acts to protect the base substrate metal of the component.

The blade airfoil and shank are hollow and include corresponding internal cooling circuits therein which receive a portion of the pressurized air bled from the compressor for cooling thereof during operation. The internal cooling channels located inside the blade shank typically include multiple radial channels defined by corresponding radial partition walls. The internal cooling circuits in the airfoil have multiple radial channels having walls that bridge the pressure and suction sides of the airfoil. The pressure and suction sides of the airfoil typically include radial rows or columns of film cooling holes extending transversely through airfoil walls.

The gas turbine blade or vane may be operated in a highly aggressive environment that may cause deterioration of the component in service. The environmental damage may be in various forms, such as particle erosion, different types of corrosion, and oxidation, and complex combinations of these damage modes, in the hot combustion gas environment. The rate of environmental damage may be lessened somewhat with the use of coatings comprising suitable protective layers.

In conventional turbine engine components aluminide coatings have been used in the internal passages of turbine blades and vanes to avoid failures from internal oxidation of the bare nickel superalloy base material. Although turbine blade alloys having greater oxidation resistance have been developed, these newer alloys may not possess adequate hot corrosion resistance. It is known in the art that oxidation of the parent material in the cooler internal blade passages is usually not very significant. However, under certain conditions hot corrosion in the cooler internal shank cavities may occur if the protective environmental coating does not provide sufficient protection against corrosive environments.

Conventional turbine engine components are typically made from nickel based superalloys. Aluminide environmental coatings are sometimes used in these conventional turbine engine components to protect the internal passages from oxidation and hot corrosion. Aluminide coatings are relatively more brittle as compared to the nickel based superalloy base material on which they are applied. Due to the brittle nature of aluminide coatings, cracks may initiate in the internal passages of turbine blades, especially in cooler and thicker areas of aluminide coating such as the blade shank. Therefore, in the relatively cooler locations of the interior passages of the turbine blade it is desirable to have an environmental coating that does not develop cracks.

Accordingly, it would be desirable to have a turbine blade having a ductile environmental coating to protect the relatively cooler internal passages from hot corrosion.

BRIEF DESCRIPTION OF THE INVENTION

The above-mentioned need or needs may be met by exemplary embodiments which provide a gas turbine blade comprising a base metal, a platform, an airfoil extending upwardly from the platform, a shank extending downwardly from the platform. The shank has an exterior wall and an internal passage, and the airfoil has a cooling flow channel inside the airfoil for flowing a cooling flow therethrough. The blade has a first chromide coating contacting the base metal of at least a portion of an interior surface of the shank and interdiffused therewith, wherein the first chromide coating does not have an aluminide coating deposited over it. The blade has a second chromide coating contacting the base metal of at least a portion of an interior surface of the airfoil and interdiffused therewith. A method for preparing a gas turbine blade comprises the steps of applying chromide coatings, sealing the interior passages of the shank and airfoil in order to prevent aluminide coating in the internal region of the shank and to reduce aluminide coating in the internal region of the airfoil, and applying an aluminide or platinum aluminide coating and an optional ceramic layer on the external region of the airfoil.

In one embodiment, the first chromide coating comprises an average of from about 20 to about 50 percent by weight chromium and has a thickness of from about 0.0005 to about 0.002 inch.

In another embodiment, an optional third and optional fourth chromide coatings are used. In a variation of this embodiment, the first, second, third and fourth chromide coatings have the same composition and are applied concurrently.

In another embodiment, the airfoil has a multi-layer coating comprising an aluminide or platinum aluminide coating overlying a chromide coating on at least a portion of the exterior surface of the airfoil. An optional ceramic layer may be used.

A method for preparing a gas turbine blade includes the steps of applying the first, second, optional third and optional fourth chromide coatings, substantially sealing the interior passages of the blade shank and airfoil in order to prevent aluminide coating in the internal region of the shank and to reduce aluminide coating in the internal region of the airfoil, and then applying an aluminide coating to at least a part of the external region of the airfoil. In another embodiment, the method further includes the step of applying a ceramic layer to at least a part of the airfoil.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
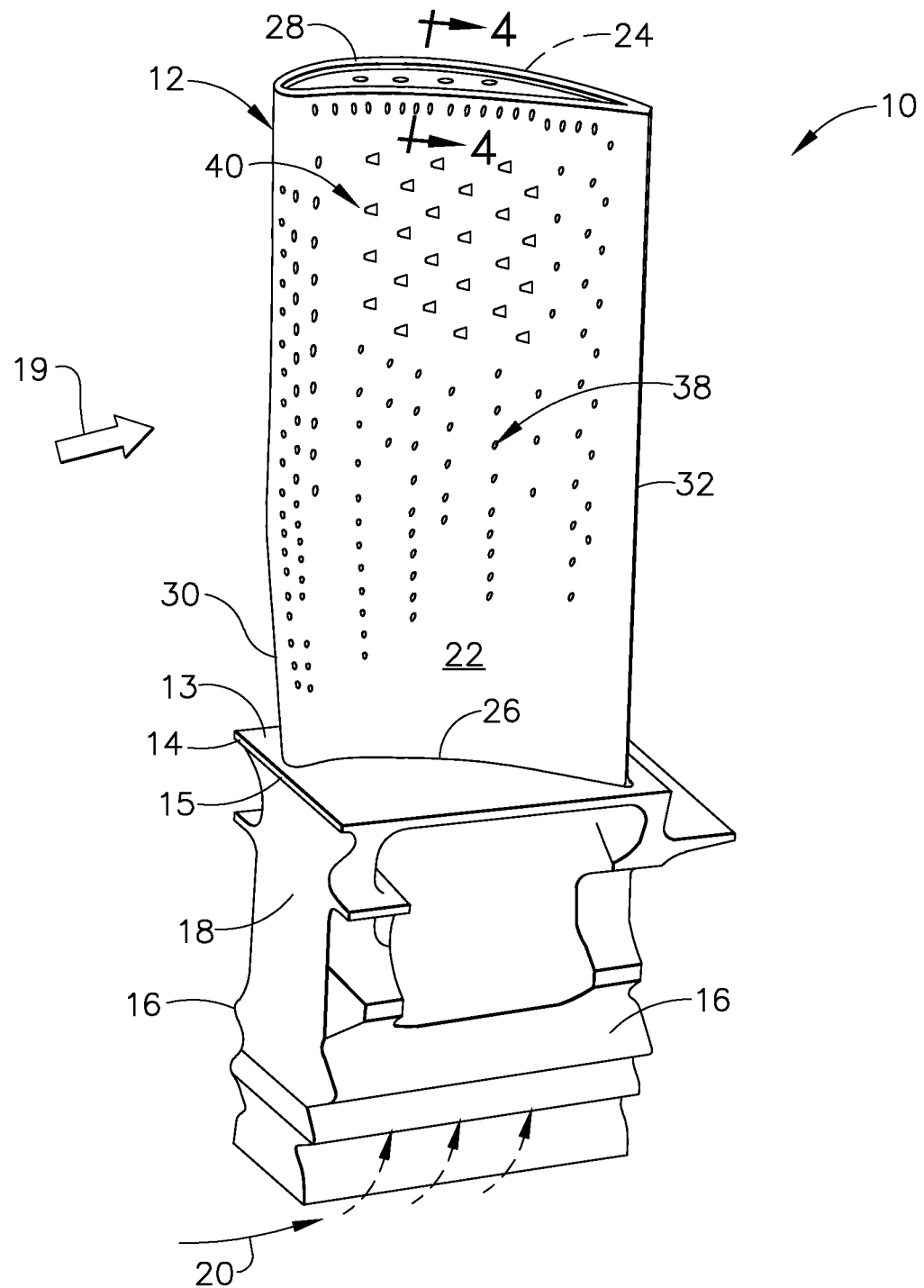
FIG. 1 is an isometric view of an exemplary turbine rotor blade.

Referring to the drawings wherein identical reference numerals denote the same elements throughout the various views, FIG. 1 shows an exemplary, turbine rotor blade 10 for use in a gas turbine engine. The blade includes an airfoil 12, platform 14, a shank 18 and supporting dovetail 16 formed in a unitary configuration by casting. The platform 14 defines a radially inner boundary for hot combustion gases 19 generated in an upstream combustor (not shown) which flow axially downstream over the airfoil 12 during operation. The turbine blade 10 is formed of any operable material, preferably a nickel-base superalloy, which is the base metal of the turbine blade 10. The base metal of the turbine blade serves as a substrate, for example, shown as items 71,73, 36, in FIGS. 3 and 4, for the coatings that are described subsequently.

The airfoil 12 and the shank 18 are hollow for receiving a cooling air coolant 20 through corresponding inlets 17 in the base of the dovetail 16 for cooling the blade during operation. The dovetail 16 is configured with supporting lobes or tangs that mate with a corresponding dovetail slot in the perimeter of a supporting rotor disk (not shown) from which the blade extends radially outwardly in the engine.

The disk includes a full row or complement of the blades 10 for extracting energy from the combustion gases for rotating the disk and in turn powering the compressor (not shown) of the engine which produces the pressurized cooling air 20. Most of the air pressurized in the compressor is mixed with fuel in the combustor for generating the hot combustion gases 19, and a small portion of the pressurized air is bled from the compressor for cooling the row of turbine blades.

The airfoil 12 includes a generally concave pressure sidewall 22, and a circumferentially opposite, generally convex suction sidewall 24 extending in radial or longitudinal span from a radially inner root 26 where the proximal end of the airfoil meets the platform 14, to a radially outer tip 28 at the opposite distal end of the airfoil. The two sidewalls 22,24 also extend axially in chord between opposite leading and trailing edges 30,32.

Figure 2:
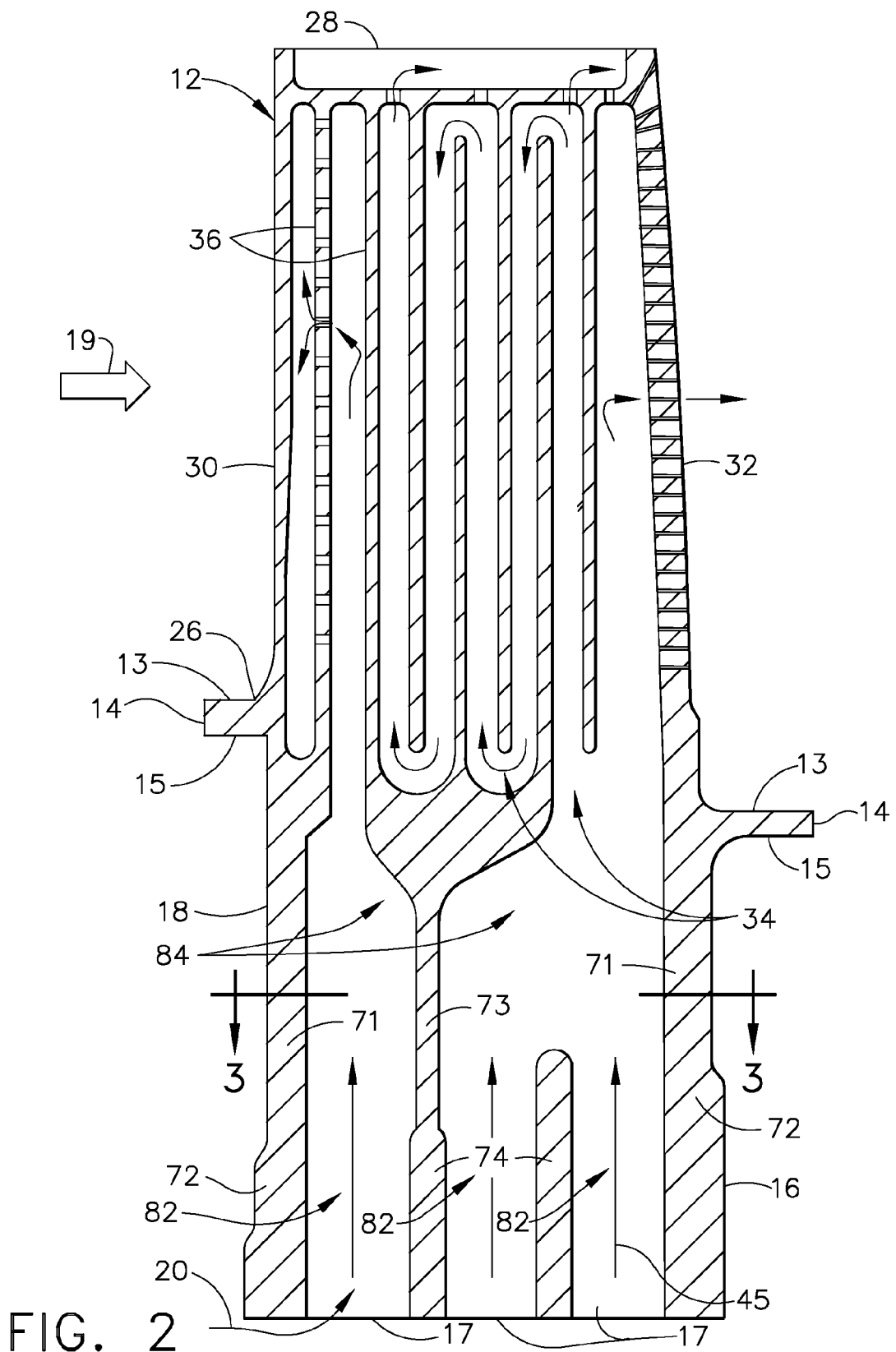
FIG. 2 is an elevational sectional view through the blade illustrated in FIG. 1.

The hollow blade illustrated in FIG. 1 is shown split in section in FIG. 2 and includes an internal cooling circuit 34 for channeling the pressurized air coolant 20 radially outwardly therethrough during operation. The two sidewalls of the airfoil are spaced circumferentially or transversely apart between the leading and trailing edges and are joined together by a plurality of chordally spaced apart internal partitions or bridges 36 which extend radially in span to define corresponding channels of the cooling circuit 34. The pressure sidewall 22 and the suction sidewall 24 include cooling holes 38 and 40 extending transversely therethrough in flow communication with the internal cooling circuit 34 for discharging the coolant 20 during operation. The multitude of cooling holes 38, 40 are different forms of film cooling holes strategically distributed over the span and chord of the pressure sidewall and suction side wall to improve the film cooling thereof and address the thermal distress discovered in the parent blade due to extended use of this type of turbine blade in years of commercial service.

The blade receives cooling air 20 through the dovetail internal passages 82 located inside the blade dovetail 16. The cooling air passes through the shank internal passages 84 located inside the shank 18 of the blade and enters the airfoil internal cooling circuit 34. The blade shank 18 is disposed between the blade platform 14 and the dovetail 16. The interior passages 84 of the shank 18 are formed by the shank exterior walls 71 and the shank interior walls 73. The blade dovetail interior passages 82 are formed by the dovetail exterior walls 72 and the dovetail interior walls 74. The shank walls 71, 73 support the mechanical loads applied by the blade airfoil 12 and the platform 14 and transfer these loads to the dovetails 16, which in turn transfer them to the supporting disk dovetails.

The basic turbine blade 10 illustrated in FIG. 1 is representative of the exemplary parent turbine blade disclosed above in the Background section which has enjoyed years of commercial use in the United States and foreign countries, but is specifically modified as disclosed herein for further enhancing life thereof by improving the environmental resistance in the interior passages of the blade. Accordingly, the turbine rotor blade illustrated in FIG. 1 may be otherwise conventional in the form of the parent blade for enjoying the long useful life thereof, while being specifically modified locally in the shank and dovetail regions thereof for improving environmental resistance of the interior cooling passages for further increasing the blade useful life.

Figure 3:
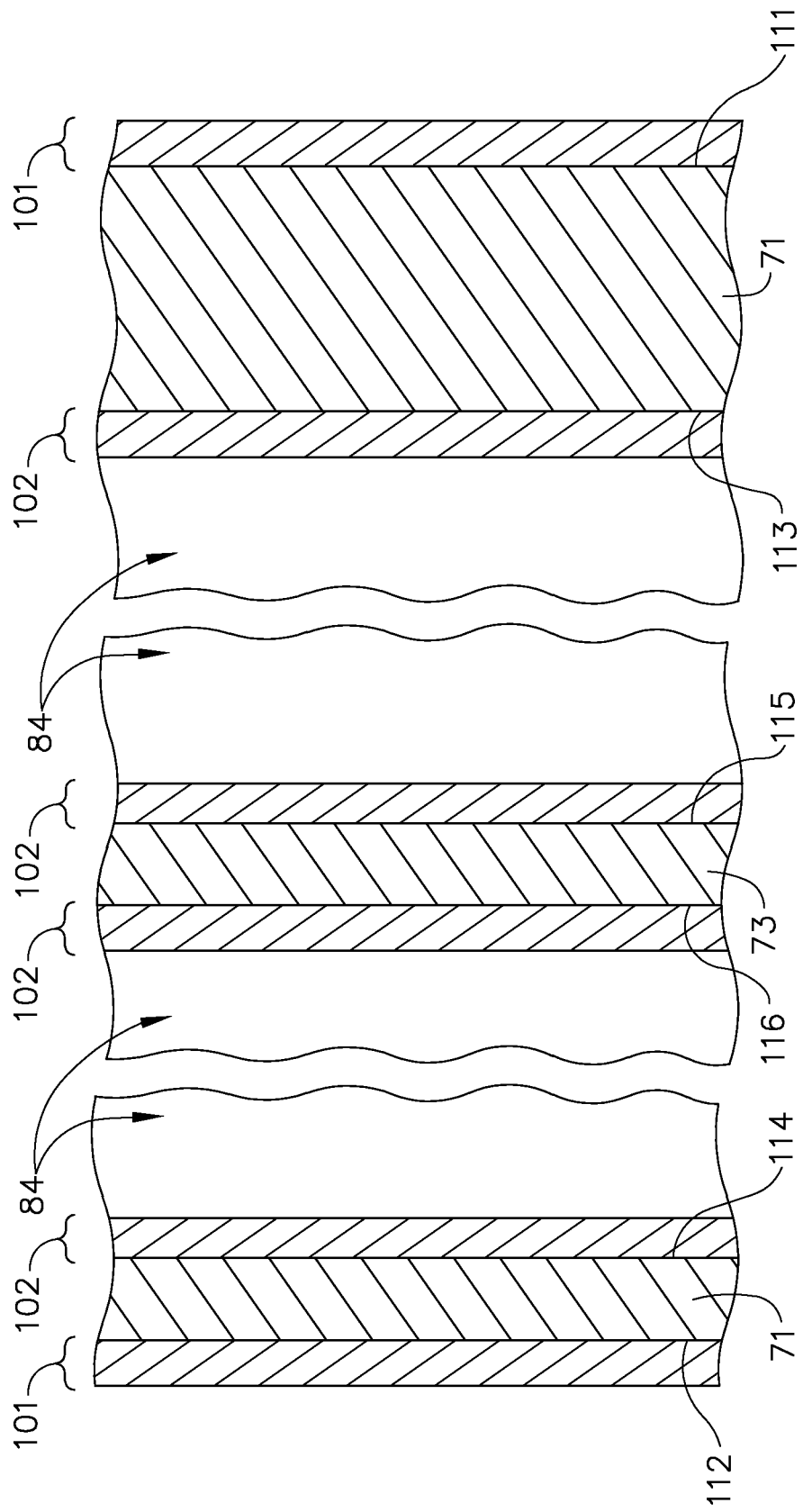
FIG. 3 is an enlarged schematic sectional view through the shank portion of the turbine blade of FIG. 2, taken on line 3-3.

FIG. 3 schematically illustrates exemplary chromide coatings 101, 102 applied to the base-metal substrates 71 and 73 of the shank 18 of a turbine blade 10. An optional fourth chromide coating 101 is applied on the outer surfaces 111, 112 of the exterior walls 71 of the shank 18. A first chromide coating 102 is applied on the interior surfaces 113, 114 of the exterior walls 71 and the surfaces 115, 116 of the internal passage walls 73 of the shank 18. Referring to FIG. 3, the optional fourth chromide coating 101 is applied to and contacts a substrate base metal 71 of at least a portion of the shank 18. The optional fourth chromide coating 101 is at least partially interdiffused with the base metal 71 of the shank 18. The optional fourth chromide coating 101 forms the entire coating on the outside of the shank 18, in the preferred form illustrated in FIG. 3. The optional fourth chromide coating 101 may be any operable chromide composition, and is preferably an average composition of from about 20 to about 50 weight percent chromium, balance interdiffused elements of the base metal, and impurities. (The term "chromide" does not suggest a particular composition such as an intermetallic composition, and instead indicates an elevated chromium composition.) Other modifying elements such as silicon may be co-deposited with the chromium, and become part of the optional fourth chromide coating 101. The optional fourth chromide coating 101 is preferably from about 0.0005 to about 0.002 inch thick. The fourth chromide coating 101 may optionally be applied to a portion of the platform 14, and optionally, to a portion of the dovetail 16. The fourth chromide coating 101 may optionally be applied to a portion of the airfoil 12.

The first chromide coating 102 comprises a chromide layer overlying and contacting the substrate base metal 71, 73 located in the interior channels of the shank 18. The first chromide coating 102 is at least partially interdiffused with the base metal 71, 73 of the dovetail 18. The first chromide coating 102 may be any operable chromide material or composition, and preferably comprises an average composition of from about 20 to about 50 weight percent chromium, balance interdiffused elements of the base metal, and impurities. Other modifying elements such as silicon may be co-deposited with the chromium, and become part of the first chromide coating 102. The first chromide coating 102 is preferably from about 0.0005 to about 0.002 inch thick.

A chromide coating, such as the first chromide coat 102, in the internal passages of a turbine blade shank 18 provides a ductile and hot corrosion resistant coating in the shank of these turbine blades. Using ductile chromide and substantially limiting brittle aluminide in the shank cavities prevents coating cracking and avoids blade failure. Chromide coating also provides increased hot corrosion resistance and sufficient oxidation resistance at the lower temperatures that are experienced within the interior airfoil passages as compared to the external blade surface. It has been found by testing that for a conventional turbine alloy, Rene 142, a chromide coating, as disclosed and described herein, provided an improved low cycle (LCF) capability of about 20,000 psi in alternating stress for typical LCF life between 10000 cycles to 100000 cycles, as compared to conventional aluminide coating. In accelerated hot corrosion tests, simulating the low temperature environment of the blade shank 18, the chromide coating was not damaged after 15 cycles whereas conventional aluminide coating showed damage after 1 cycle.

Figure 4:
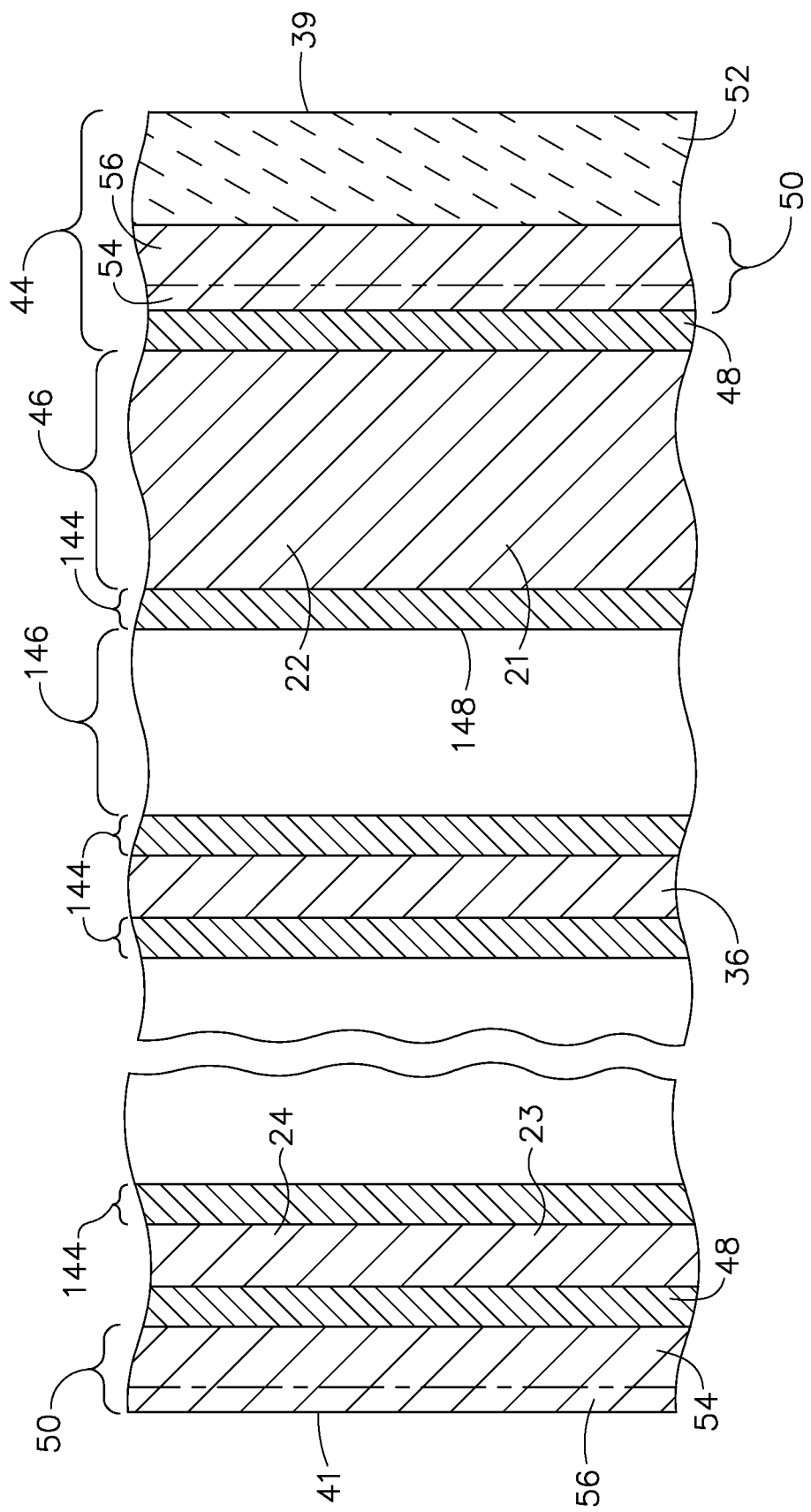
FIG. 4 is an enlarged schematic sectional view through the airfoil portion of the turbine blade of FIG. 1, taken on line 4-4.

FIG. 4 schematically illustrates an exemplary multi-layer coating system 44 comprising an optional third chromide coating 48, a platinum-aluminide coating 50, and an optional-but-preferred ceramic thermal barrier coating 52 applied to the airfoil 12 of the turbine blade 10. Referring to FIG. 4, the exemplary multi-layer coating system 44 is applied to and contacts at least a portion of the third chromide coating 48 on the airfoil 112. The substrate base metal 46 of the airfoil 12 is usually of the same composition as the substrate base metal 71 of the shank 18, because the entire turbine blade 10 is typically cast as an integral piece of a single composition of metal. Optionally, the multi-layer coating system 44 may also be applied to a portion of the top side 13 of the platform 14 located opposite the bottom side 15 of the platform 14.

The multi-layer coating system 44 comprises optional third chromide coating 48 overlying and contacting the substrate base metal 46 of the airfoil 12. The optional third chromide coating 48 is at least partially interdiffused with the base metal 46 of the airfoil 12. The optional third chromide coating 48 may be any operable chromide material or composition, and preferably comprises an average composition of from about 20 to about 50 weight percent chromium, balance interdiffused elements of the base metal, and impurities. Other modifying elements such as silicon may be co-deposited with the chromium, and become part of the optional third chromide coating 48. The optional third chromide coating 48 is preferably from about 0.0005 to about 0.002 inch thick. It is preferred that the optional third chromide coating 48 be of substantially the same composition and thickness as the optional fourth chromide coating 101 applied to the shank 18, and that the optional fourth chromide coating 101 and the optional third chromide coating 48 be applied to the substrate 21 at the same time and using the same technique, as will be discussed in more detail subsequently.

FIG. 4 schematically illustrates a second chromide coating 144 applied to the interior surfaces of the airfoil 12 and the internal partitions 36 forming the internal cooling circuits 34. The second chromide coating 144 comprises a chromide layer overlying and contacting the substrate base metal 21 of the pressure side wall 22 of the airfoil 12, substrate base metal 23 of the suction side wall 24 of the airfoil 12 and the internal cooling passage partition wall substrate 36 of the airfoil 12. The second chromide coating 144 is at least partially interdiffused with the corresponding substrate base metal of the airfoil 12 on which it is applied. The second chromide coating 144 may be any operable chromide material or composition, and preferably comprises an average composition of from about 20 to about 50 weight percent chromium, balance interdiffused elements of the base metal, and impurities. Other modifying elements such as silicon may be co-deposited with the chromium, and become part of the second chromide coating 144. The second chromide coating 144 is preferably from about 0.0005 to about 0.002 inch thick.

It is preferred that the first, second, optional third and the optional fourth chromide coatings, 102, 144, 48 and 101 respectively, be of substantially the same composition and thickness. It is preferred that the first, second, optional third and the optional fourth chromide coatings, 102, 144, 48 and 101 respectively, be applied to their respective substrates at the same time and using the same technique, as will be discussed in more detail subsequently.

The multi-layer coating system 44 comprises a protective layer 50. The protective layer 50 overlies and contacts the optional third chromide coating 48. The protective layer 50 preferably comprises either a diffusion aluminide or a diffusion platinum aluminide. The preferred diffusion aluminide protective layer 50 preferably comprises aluminum modified by the addition of the following elements to improve corrosion resistance: chromium, hafnium, silicon, zirconium, yttrium, platinum, and palladium, and combinations thereof The modifying element is present in an effective amount. Typical amounts of the modifying elements that are present, either alone or in combination in compatible compositions, include, in weight percent, from about 2 to about 50 percent chromium, from about 0.1 to about 20 percent hafnium, from about 0.1 to about 10 percent silicon, from about 0.1 to about 5 percent zirconium, from about 0.1 to about 5 percent yttrium, from about 0.1 to about 50 percent palladium, and from about 0.1 to about 50 percent platinum (in which case the protective layer 50 is termed a platinum aluminide). The aluminum and the corrosion-improving modifying element are at least partially interdiffused with the substrate base metal 46 and the optional third chromide coating 48, rather than being present as an overlay coating. The protective layer 50 is preferably from about 0.0005 inch to about 0.005 inch thick.

The protective layer 50 may instead be a MCrAlX overlay protective layer or a NiAl intermetallic overlay protective layer. MCrAlX overlay protective layers are known in the art (see, for example, U.S. Pat. Nos. 4,321,411, 4,401,697 and 4,405,659). MCrAlX overlay protective layers primarily have high Cr and a beta/gamma phase structure. Nickel aluminide protective overlays, such as NiAlCrZr, are of a predominantly beta NiAl phase and are known in the art in (see, for example, U.S. Pat. Nos. 6,153,313, 6,255,001, and 6,291,084). The terminology "MCrAlX" is a shorthand term of art for a variety of families of overlay protective layers that may be employed as environmental coatings or bond coats in thermal barrier coating systems. In this and other forms, M refers to nickel, cobalt, iron, and combinations thereof. In some of these protective coatings, the chromium may be omitted. The MCrAlX overlay protective layer and the NiAl intermetallic overlay protective layer may optionally contain elements such as hafnium, zirconium, yttrium, tantalum, rhenium, platinum, silicon, titanium, boron, carbon, and combinations thereof. Specific compositions are known in the art. Some example compositions include NiAlCrZr and NiAlCrY, but this listing of examples is not to be taken as limiting. The overlay protective coatings may interdiffuse with the substrate base metal 46 and the optional third chromide coating 48, but any such interdiffusion is relatively slight so that the overlay protective coatings remains discrete.

Optionally, the multi-layer coating system 44 may further comprise a ceramic layer 52 overlying and contacting the protective layer 50. The ceramic layer 52 is a ceramic material that serves as a thermal barrier coating to insulate the underlying layers. The ceramic layer 52 is usually applied only in those regions of the airfoil 12 that are subjected to the highest temperatures. For example, the multi-layer coating system 44 as applied to the suction side 24 may not require the use of the ceramic layer 52, while the multi-layer coating system 44 as applied to the high-pressure side 22 may include the ceramic layer 52. The ceramic layer 52 is preferably yttria stabilized zirconia, which is zirconium oxide containing from about 2 to about 12 weight percent, preferably from about 3 to about 8 weight percent, of yttrium oxide. The ceramic layer 52 is typically from about 0.003 to about 0.010 inch thick. Other operable ceramic materials and thicknesses may be used as well. When there is no ceramic layer 52 present, the multi-layer coating system 44 is termed an "environmental coating". When there is a ceramic layer 52 present, the multi-layer coating system 44 is termed a "thermal barrier coating system", and the optional third chromide coating 48 and the protective layer 50 serve as the "bond coat" for the ceramic layer 52.

Figure 5:
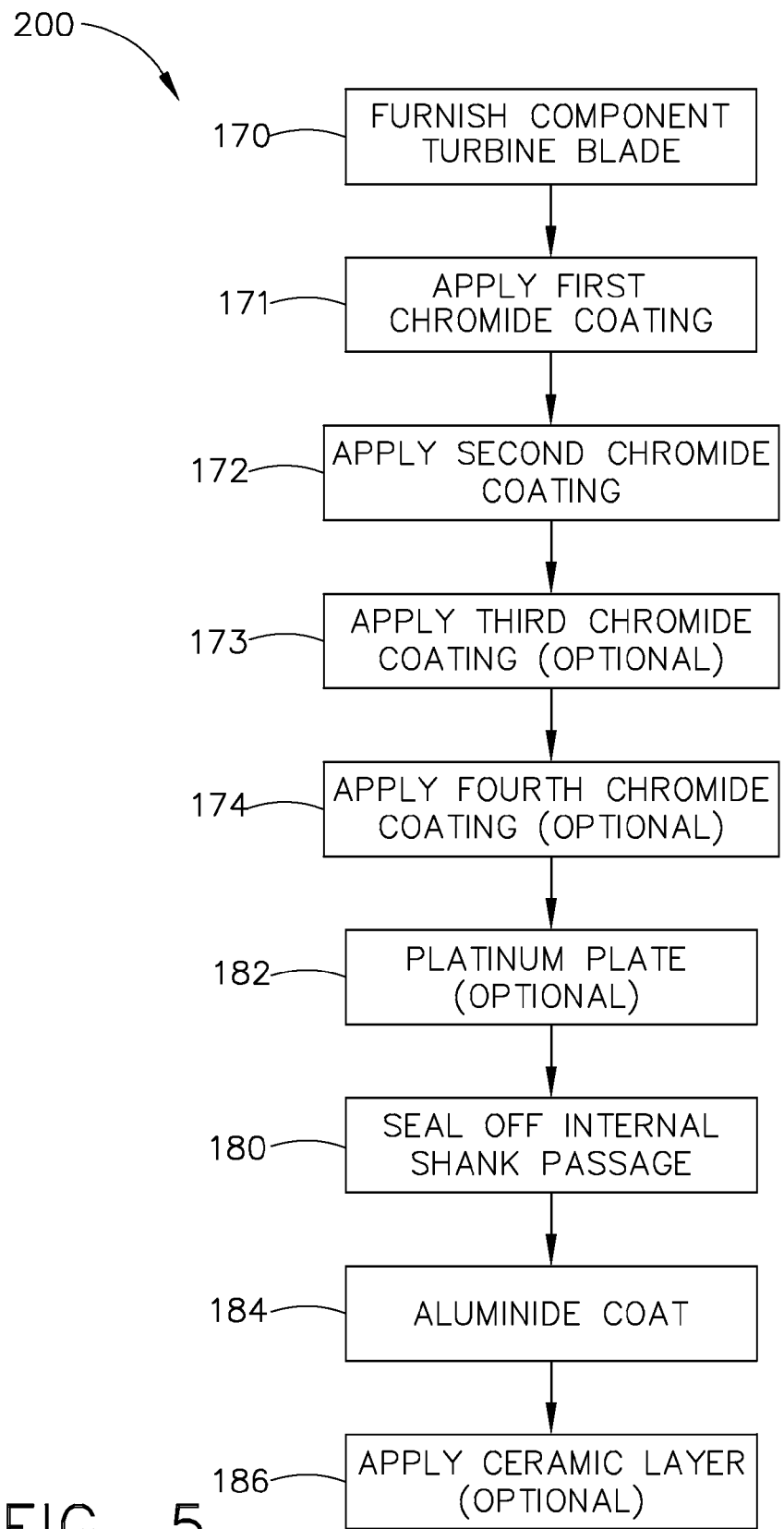
FIG. 5 is a block flow diagram of an exemplary embodiment of an approach for preparing a coated gas turbine component.

FIG. 5 depicts in block diagram form an exemplary embodiment of a method for coating turbine component with chromide coatings. A turbine component is provided, numeral 170. The turbine component is preferably the turbine blade 10 of FIG. 1. The turbine component is typically cast to the desired shape, as in the case of the turbine blade 10. The chromide coatings are applied to the turbine blade at the cast or machined level using any conventional deposition process, preferably using a vapor deposition process. The furnished turbine component is in a clean state, or may be cleaned of surface residue, casting defects, and the like in this step 170, using standard procedures. The turbine component may be made of any operable material, with a nickel-base superalloy being preferred. As used herein, "nickel-base" means that the composition has more nickel present than any other element. The nickel-base superalloys are typically of a composition that is strengthened by the precipitation of gamma-prime phase. The preferred nickel-base alloy has a composition, in weight percent, of from about 4 to about 20 percent cobalt, from about 1 to about 10 percent chromium, from about 5 to about 7 percent aluminum, from 0 to about 2 percent molybdenum, from about 3 to about 8 percent tungsten, from about 4 to about 12 percent tantalum, from 0 to about 2 percent titanium, from 0 to about 8 percent rhenium, from 0 to about 6 percent ruthenium, from 0 to about 1 percent niobium, from 0 to about 0.1 percent carbon, from 0 to about 0.01 percent boron, from 0 to about 0.1 percent yttrium, from 0 to about 1.5 percent hafnium, balance nickel and incidental impurities.

A most preferred alloy composition is Rene' N5, which has a nominal composition in weight percent of about 7.5 percent cobalt, about 7 percent chromium, about 6.2 percent aluminum, about 6.5 percent tantalum, about 5 percent tungsten, about 1.5 percent molybdenum, about 3 percent rhenium, about 0.05 percent carbon, about 0.004 percent boron, about 0.15 percent hafnium, up to about 0.01 percent yttrium, balance nickel and incidental impurities. Other operable superalloys include, for example, Rene' N6, which has a nominal composition in weight percent of about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.15 percent hafnium, about 0.05 percent carbon, about 0.004 percent boron, about 0.01 percent yttrium, balance nickel and incidental impurities; Rene' 142, which has a nominal composition in weight percent of about 6.8 percent chromium, about 12.0 percent cobalt, about 1.5 percent molybdenum, about 2.8 percent rhenium, about 1.5 percent hafnium, about 6.15 percent aluminum, about 4.9 percent tungsten, about 6.35 percent tantalum, about 150 parts per million boron. about 0.12 percent carbon, balance nickel and incidental impurities. The use of the present invention is not limited to turbine components made of the preferred alloy described herein, and has broader applicability.

In the next four steps, 171, 172, 173 and 174, chromide coatings are applied to their respective locations on the blade 10. Specifically, the first chromide coating 102 is applied (numeral 171) to the interior passage surfaces 113, 114, 115 and 116 of the shank 18; the second chromide coating 144 is applied (numeral 172) to the interior surfaces of the airfoil pressure side wall 22 and suction side wall 24 and to the surfaces of the airfoil internal cooling passage walls 36 as discussed previously; the optional third chromide coating 48 is applied (numeral 173) to the outside surface of the airfoil 12 pressure side wall 22 and suction side wall 24; and, the optional fourth chromide coating 101 is applied (numeral 174) to the outside surface 111, 112 of the shank 18. The sequence of steps described above is meant to be only exemplary and is not limiting. The steps 171, 172, 173 and 174 may be performed in any order, simultaneously or sequentially, or may be performed partially simultaneously and partially sequentially.

In an exemplary embodiment of the invention, the first, second, third and fourth chromide coatings (items 102, 144, 48 and 101 in FIGS. 3 and 4) are applied simultaneously, by simultaneously performing steps 171, 172, 173 and 174 shown in FIG. 5. Any portions of the turbine blade 10 which are not to be coated with the chromide coating, such as portions of the dovetail 16, may be masked using conventional masking techniques to prevent coating thereon. The steps 171, 172, 173 and 174 are therefore preferably accomplished simultaneously by any operable process, most preferably by vapor deposition. In this approach, a halide, such as ammonium chloride, is vaporized and contacted with chromium metal or a chromium alloy to form the corresponding chromium halide gas. Chromide-modifying elements such as, but not limited to, silicon may optionally be doped from similar sources into the gaseous source. The source gas is contacted to the portions of the turbine blade which are to be chromide coated. The temperature of the base metal during this contacting is from about 1800 Deg. F. to about 2100 Deg. F. Other deposition techniques such as chemical vapor deposition may also be used. During the interdiffusion process, which is conducted at elevated temperature, there is an interdiffusion of the deposited chromium into the base metal. If desired, additional diffusion may be accomplished by extending the period during which the turbine blade 10 is exposed to elevated temperature, but without deposition of additional chromium. The result of the deposition of chromium and simultaneous and/or subsequent interdiffusion is the first chromide coating 102, the second chromide coating 144, the third chromide coating 48 and the fourth chromide coating 101, each about 0.0005 to about 0.002 inch thick and having a composition of an average of from about 20 to about 50 weight percent chromium, the chromide-modifying elements, if any, and balance the elements of the base metal and impurities. With this technique, the first chromide coating 102, the second chromide coating 144, the optional third chromide coating 48 and the optional fourth chromide coating 101 are deposited and interdiffused with the base metal in from about 1 to 10 hours, preferably from about 1 to about 4 hours, most preferably about 2 hours. This completes the application of the chromide coatings, except for any post-application steps such as machining or cleaning that are known in the art.

In the next step 180, the internal passages of the blade are blocked off to substantially prevent a subsequent coating of the internal passages during subsequent coating applications, such as the platinum-aluminide coating, on the outside of the airfoil 12. Exemplary methods of limiting further coating of the internal surfaces of the blade are using static vapor processes, using pack aluminiding process, or masking of internal passages. The preferred method is to block the blade dovetail openings, such as the inlets 17, while leaving the blade airfoil holes 38, 40 open. The aluminide coating cycle is done preferably with no forced flow through the blade internal passages such as items 34, 82, 84 shown in FIG. 2. By blocking the blade dovetail openings, the blade shank internal passages 84 will not be coated with aluminide and the airfoil internal passages 34 will have only a minimal aluminide coating.

In the next steps, numerals 182 and 184, the protective layer 50 of the multi-layer coating 44 is applied. The step of platinum plating, numeral 182, is optional. The protective layer 50 is preferably a diffusion aluminide or a diffusion platinum aluminide, optionally modified by the presence of alloying elements. Coating of the turbine blade 10 with diffusion aluminide or diffusion platinum aluminide, can be performed by conventional methods known in the art. The protective layer 50 of the second coating 44 is applied, numeral 184. The protective layer 50 is preferably a diffusion aluminide or a diffusion platinum aluminide, optionally modified by the presence of alloying elements. In the case of a diffusion aluminide, the source of aluminum is preferably a gaseous source, as in vapor phase aluminiding. In this approach, a halide gas is contacted with aluminum metal or an aluminum alloy to form the corresponding aluminum halide gas. Aluminide-modifying elements, such as hafnium, zirconium, yttrium, silicon, titanium, tantalum, cobalt, chromium, platinum, and palladium, may optionally be doped from similar sources into the gaseous source. The source gas is contacted to the portions of the turbine blade which are to be protected by the protective layer 50 of the multi-layer coating 44. This may include the surfaces already having chromide coatings, such as for example item 48. Aluminum, with any optional dopants included, is deposited onto the contacted surface. The deposition reaction typically occurs at elevated temperature such as from about 1800 Deg. F. to about 2100 Deg. F. so that deposited aluminum atoms interdiffuse into the base metal and the optional third chromide coating 48. (The chromium atoms of other chromide coatings that may be present at other locations, such as the shank 18, also may continue to interdiffuse with the base metal during this elevated-temperature operation.) An aluminum coating about 0.002 inch thick may be deposited in about 4-8 hours using this approach. Other known and operable aluminum-deposition techniques such as pack cementation, above-the-pack aluminiding, slurry deposition, chemical vapor deposition (CVD), and organo-metallic chemical vapor deposition may also be used.

If the multi-layer coating system 44 is to have a diffusion platinum aluminide, a sublayer 54 of platinum may be deposited onto the optional third chromide coating 48, before the sublayer 56 of aluminum is deposited over the sublayer 54 of platinum. The combination of the optional third chromide coating 48 and a platinum-aluminide protective layer 50 gives particularly good corrosion and oxidation resistance in the service temperature range of operation. The deposition of the sublayer 54 of platinum is accomplished by depositing platinum from solution onto the optional third chromide coating 48. An operable platinum-containing aqueous solution is $Pt(NH_3)_4HPO_4$ having a concentration of about 4-20 grams per liter of platinum, and a voltage/current source is operated at about ½-10 amperes per square foot of facing article surface. The platinum sublayer 54 about 5 micrometers thick is deposited in 1-4 hours at a temperature of 190-200 Deg. F. The aluminum sublayer 56 is thereafter deposited overlying the platinum sublayer 54, using the aluminum deposition approach described above. A significant amount of interdiffusion of the platinum sublayer 54, the aluminum sublayer 56, the optional third chromide coating 48 and the substrate base metal 46 is achieved during the aluminum deposition. Additional interdiffusion may be accomplished if desired by maintaining the structure at elevated temperature after the flow of halide gas is discontinued.

In the next optional step, numeral 186 of FIG. 5, the ceramic layer 52 is optionally deposited overlying the protective layer 50 of the multi-layer coating 44. The ceramic layer 52 is preferably from about 0.003 to about 0.010 inch thick, most preferably about 0.005 inch thick. The ceramic layer 52 is preferably yttria stabilized zirconia, which is zirconium oxide containing from about 2 to about 12 weight percent, most preferably from about 3 to about 8 weight percent, of yttrium oxide. It may be deposited by any operable technique, such as physical vapor deposition or thermal spray. Other operable ceramic materials may be used as well.

The internal cavities of the airfoil 12 of the blade 10 are substantially free of coatings other than the second chromide coating 144. However, it is possible that some of the platinum or aluminide elements, during their application in steps 82 and 84, may enter the internal cooling passages of the airfoil 12 through the cooling holes such as 38 and 40 (see FIG. 1). These traces of the platinum or aluminide elements may form a small layer of aluminide or platinum aluminide coating on the chromide coatings in the internal airfoil cavities near the cooling holes 38, 40. Such minimal amount of coatings other than chromide coatings within the interior surfaces of the airfoil portion of the blade 10 are within the scope of the embodiments of the present invention.

The improved blade may be used in a new engine or as a retrofit in an existing engine.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gas turbine blade, comprising:
   a base metal;
   a platform;
   an airfoil extending upwardly from the platform, the airfoil having a cooling flow channel located inside the airfoil for flowing a cooling flow therethrough;
   a shank extending downwardly from the platform, the shank having an exterior surface and an internal passage located inside the shank for flowing a cooling flow therethrough to the cooling flow channel of the airfoil;
   a dovetail extending downwardly from the shank, the dovetail having an exterior surface and having an internal passage located therein for flowing a cooling flow therethrough to the internal passage of the shank;
   a first interior chromide coating contacting the base metal of at least a portion of an interior surface of the internal passage within the shank and contacting at least a portion of an interior surface of the internal passage within the dovetail and interdiffused therewith;
   a second interior chromide coating contacting the base metal of at least a portion of an interior surface of the airfoil and interdiffused therewith; and
   a protective layer on at least a portion of an exterior surface of the airfoil, the protective layer being chosen from the group consisting of diffusion aluminide and diffusion platinum aluminide coatings;
   wherein the first and second interior chromide coatings and the exterior surfaces of the shank and dovetail do not have an aluminide coating deposited thereon; and
   wherein the exterior surfaces of the airfoil, shank and dovetail do not have a chromide coating deposited thereon.

2. A gas turbine blade according to claim 1, wherein the first interior chromide coating comprises an average of about 20 to about 50 percent by weight chromium.

3. A gas turbine blade according to claim 1, wherein the first interior chromide coating has a thickness of from about 0.0005 to about 0.002 inch.

4. A gas turbine blade according to claim 1, wherein the second interior chromide coating comprises an average of about 20 to about 50 percent by weight chromium.

5. A gas turbine blade according to claim 1, wherein the second interior chromide coating has a thickness of from about 0.0005 to about 0.002 inch.

6. A gas turbine blade according to claim 1, wherein the base metal has a composition, in weight percent, of from about 4 to about 20 percent cobalt, from about 1 to about 10 percent chromium, from about 5 to about 7 percent aluminum, from 0 to about 2 percent molybdenum, from about 3 to about 8 percent tungsten, from about 4 to about 12 percent tantalum, from 0 to about 2 percent titanium, from 0 to about 8 percent rhenium, from 0 to about 6 percent ruthenium, from 0 to about 1 percent niobium, from 0 to about 0.1 percent carbon, from 0 to about 0.01 percent boron, from 0 to about 0.1 percent yttrium, from 0 to about 1.5 percent hafnium, balance nickel and incidental impurities.

7. A gas turbine blade according to claim 1, further comprising a ceramic layer overlying at least a portion of the protective layer.

* * * * *